Figure 1:
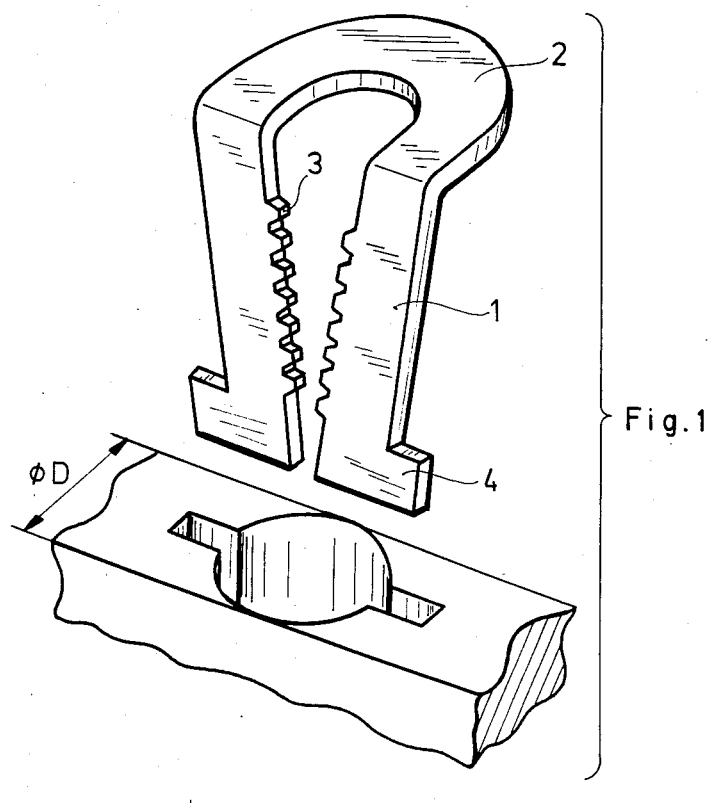

United States Patent [19]

Trummer

[11] Patent Number: 4,548,534
[45] Date of Patent: Oct. 22, 1985

[54] SCREW FIXING ELEMENT
[75] Inventor: Gábor Trummer, Budapest, Hungary
[73] Assignee: Kontakta Alkatreszgyar, Budapest, Hungary
[21] Appl. No.: 481,276
[22] Filed: Apr. 1, 1983
[51] Int. Cl.⁴ .............................................. F16B 13/06
[52] U.S. Cl. ........................................ 411/61; 411/21;
411/173; 411/437; 24/453; 403/248; 403/381
[58] Field of Search .............. 411/437, 217, 436, 218,
411/340, 221, 429, 432, 433, 21, 22, 60, 61, 74,
44-48, 177, 179, 172-175, 183, 508-510, 522,
528, 529, 32, 33; 403/381, 251, 248, 290;
24/453, 703

[56] References Cited

U.S. PATENT DOCUMENTS

| | | | |
|---|---|---|---|
| 1,920,141 | 7/1933 | Fischer | 411/432 |
| 2,278,708 | 4/1942 | Miller | 411/522 |
| 2,386,824 | 10/1945 | Tinnerman | 411/436 |
| 3,297,916 | 1/1967 | Wright | 411/522 |
| 3,565,473 | 2/1971 | Kedel | 411/522 |
| 4,188,854 | 2/1980 | Hoehn | 411/437 |
| 4,430,033 | 2/1984 | McKewan | 411/177 |

FOREIGN PATENT DOCUMENTS 1233661  2/1967  Fed. Rep. of Germany ........ 411/60

Primary Examiner—Gary L. Smith
Assistant Examiner—Neill Wilson
Attorney, Agent, or Firm—Murray Schaffer

[57] ABSTRACT

A horseshoe shaped body formed of planar sheet metal is formed with a pair of legs joined at one end by an arcuate web. A portion of the web is bent perpendicularly to the legs, and each of said legs has a flange extending outwardly within the plane of the body at each of its free ends. A series of teeth along the inner edges thereof receive and mesh with the threads of the screw inserted therebetween.

2 Claims, 2 Drawing Figures

SCREW FIXING ELEMENT

The invention relates to a fixing element for screws, which can be well used as a substitution for backed and inserted nuts.

As it is well known, fixing of screws can be realized by using nuts. The female thread is a closed path, the pitch of which corresponds to the pitch of a given screw, which is leading the screw, determines the direction of motion and enables the tightening if the connection.

In case of synthetic materials, as their strength is insufficient, there is no possibility for forming a female thread therein, thus, if a screwed joint is wanted, a threaded metal insert is backed or seated into the synthetic material.

Out of the two methods the subsequent placing of the metal inserts has been found as more economical. In these cases threaded sleeves having been secured against rotation and pulling out and shaped by cutting used to be applied, which are flanged or fixed in any other suitable manner to the synthetic material.

Screwed joints having been formed with said methods are material— and time consumptive, in addition to it performance requires workmanship.

The aim of the invention is to develop a fixing element, by the aid of which threaded joint can be realzed in synthetic materials by using simple and cheap methods and which is well suitable for substituting threaded sleeves.

The essence of the fixing element according to the invention lies in that from a metal sheet two symmetrically shaped shanks forming a piece each, as well as a sheet-arc interconnecting one end of the shanks are formed, while the other end of said shank is convergently formed; in the inner wall of the shanks there is a toothed part for the receipt of the screw-thread. The interconnecting metal sheet arc is bent perpendicularly to the plane of the shanks, while on the other end of the shanks a flange is lying perpendicularly to the edges of the shanks.

Figure 2:
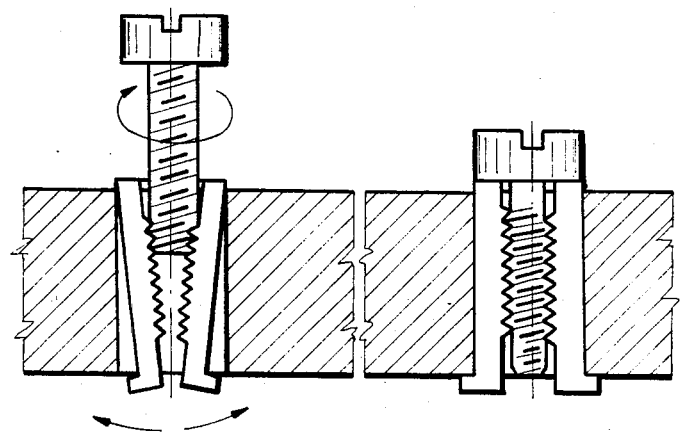

The invention will be described in details by means of the preferred embodiments of the invention, by the aid of the drawing enclosed, wherein:

FIG. 1 is showing a preferably embodiment of the fixing element according to the invention, made of a metal sheet, as well as the cut in the sythetic material for the arrangement of the fixing element, FIG. 2 the arrangement of the fixing element according to FIG. 1 in the synthetic material, as well as the fixing screw.

The fixing element made of a metal sheet and to be seen in FIG. 1 consists of shanks 1, semi-circular sheet-arc 2, the toothing 3 and of the flange 4. The two shanks are shaped convergently, accordingly, the fixing element can be led without difficulty into the groove with the parallel walls, while the metal sheet-arc 2 is bent perpendicularly to the plane of the two shanks 1.

The advantage of the fixing element according to the invention lies in that it can be formed most easily from the sheet material and arrangement thereof in the groove having been formed in the synthetic material does not require special skill. The prerequisite for the insertion lies in that the diameter D of the bore receiving the screw must not be larger, than the nominal size of the screw and the lateral planes of the grooves taking up the fixing element should be symmetrical with the longitudinal axis of the screw-bore.

After having inserted the screw and while screwing it continuously into the synthetic material, the convergent shanks 1 of the fixing element are bearing up against the wall of the bore.

The fixing element shown in FIG. 1 is well suitable for through-bores too, in which case the flanges 4 having been formed on the shanks 1 are securing the fixing element against pulling out.

The fixing element according to the invention, made of a metal sheet has a most simple design, it can be produced in large series in an easy and most economical manner and represents a cheap element for fixing of screws.

What I claim is:

1. A fixing element for securing threaded fasteners in a through bore formed in a body of synthetic material comprising a generally horseshoe shaped body formed of planar sheet metal, said body having a pair of legs lying in a common plane and joined at one end by an arcuate web, said web being bent to lie in a plane perpendicular to the plane of said legs, each of said legs having a flange at each of its free ends extending outwardly within the plane of the body, and a series of teeth along the inner edges thereof for receiving and meshing with the threads of the screw inserted therebetween said legs being of such length as to span said hole and to permit said flanges to engage over one end of said hole and said bent arcuate web to ensure over the opposite end of said hole.

2. The screw fixing element according to claim 1 wherein the legs are normally bent toward each other in their common plane.

* * * * *